(12) United States Patent
Mitzman

(10) Patent No.: US 6,357,784 B1
(45) Date of Patent: Mar. 19, 2002

(54) COLLAPSIBLE PUSHCHAIR

(76) Inventor: Richard Hugh Mitzman, 47A Primroses Gardens, London NW3 UL (GB)

(*) Notice: Subject to any disclaimer, the term of this patent is extended or adjusted under 35 U.S.C. 154(b) by 0 days.

(21) Appl. No.: 09/202,379

(22) PCT Filed: Jun. 12, 1997

(86) PCT No.: PCT/GB97/01590
§ 371 Date: Mar. 24, 1999
§ 102(e) Date: Mar. 24, 1999

(87) PCT Pub. No.: WO97/47507
PCT Pub. Date: Dec. 18, 1997

(30) Foreign Application Priority Data

Jun. 13, 1996 (GB) ............................................ 9612381

(51) Int. Cl.$^7$ ................................................ B62B 7/06
(52) U.S. Cl. ...................... 280/642; 280/650; 280/30
(58) Field of Search ........................ 280/30, 639, 641, 280/642, 647, 650, 655, 657, 658, 47.24, 47.25, 47.38, 79.2, 47.2

(56) References Cited

U.S. PATENT DOCUMENTS

| | | | |
|---|---|---|---|
| 2,670,216 A | * 2/1954 | Leonard | 280/47.25 |
| 2,761,690 A | * 9/1956 | Bradley | 280/47.2 |
| 3,361,439 A | 1/1968 | Olson | |
| 3,633,932 A | * 1/1972 | Holden | 280/641 |
| 4,586,721 A | * 5/1986 | Harada et al. | 280/30 |
| 4,657,269 A | * 4/1987 | Elvin | 280/47.38 |
| 4,736,959 A | * 4/1988 | Van Steenburg | 280/30 |
| 5,207,439 A | * 5/1993 | Mortenson | 280/47.2 |
| 5,301,963 A | * 4/1994 | Chen | 280/658 |

FOREIGN PATENT DOCUMENTS

| | | | |
|---|---|---|---|
| DE | 230208 | * 1/1911 | 280/47.25 |
| FR | 848312 | * 10/1939 | 280/47.38 |
| FR | 2230195 | * 12/1974 | 280/650 |
| FR | 2306859 | 11/1976 | B62B/7/06 |
| FR | 2718407 | 10/1995 | B62B/9/008 |
| GB | 230626 | 3/1924 | |
| GB | 2231537 | * 11/1990 | 280/30 |
| GB | 2244029 A | 11/1991 | B62B/7/12 |
| GB | 2251830 | * 7/1992 | 280/642 |

* cited by examiner

Primary Examiner—Frank Vanaman
(74) Attorney, Agent, or Firm—Davidson, Davidson & Kappel, LLC

(57) ABSTRACT

A collapsible pushchair has a chassis having mounted thereon 1) a foldable seat; 2) a seat hanger pivotally mounted to the chassis; 3) a pair of coaxial primary wheels fitted to the front of the chassis; 4) a handle pivotable into a collapsed position against the chassis; and 5) a pair of coaxial secondary wheels attached to the rear of the chassis by means operable to allow them to be folded into a stowed position between the primary wheels in which the pushchair can be pushed or pulled on its primary wheels when a baby or infant is in position on the seat and unfolded into an operative position in which they are spaced rearwardly from the chassis. The handle is slidably received in the seat hanger such that a portion of the handle is stowable in the seat hanger when the handle and seat hanger are in the collapsed position against the chassis, and the seat is attached to the seat hanger so that the seat folds in response to movement of the handle into the collapsed position against the chassis.

22 Claims, 6 Drawing Sheets

COLLAPSIBLE PUSHCHAIR

BACKGROUND OF THE INVENTION

1. Field of the Invention

This invention relates to a collapsible pushchair for infants otherwise known as a baby buggy or stroller and more particularly to a pushchair which can be collapsed to a size which is extremely compact and acceptable as carry-on luggage on airplanes.

Collapsible pushchairs are well known. Generally these have a large number of tubular frame members which are hingedly connected together in such a way that the pushchair or stroller can be readily collapsed into a more compact configuration suitable for storage when not in use.

A major problem with known pushchairs is that they can be difficult to maneuver up or down stairs, escalators, street curbs or on and off buses or trains.

Another problem with fully collapsible pushchairs is that they are generally made of lightweight tubular material and they do not provide the mother with anywhere to store her shopping. As a result, she has little choice but to hang her shopping bags on the back of the pushchair, (generally on the handles), but this can seriously destabilize it and even result in it tipping over which is extremely dangerous and therefore unacceptable. They can also be quite cumbersome when collapsed and this is a particular problem when they are to be taken on to an airplanes because very often they exceed the permitted dimensions for "carry-on" luggage and therefore have to be stowed in the hold of the aircraft. This is generally inconvenient for the mother as she wants to have the pushchair close to her when she disembarks from the plane and therefore wants to be able to store it in the overhead lockers of the aircraft.

2. Description of the Related Art

FR-A-2306859 discloses a collapsible pushchair comprising a chassis having mounted thereon a pair of primary wheels, a handle for pushing or pulling the pushchair along, and a pair of secondary wheels attached to the chassis by means operable to allow them to be unfolded from a stowed position in the chassis adjacent the primary wheels to an operating position in which they are spaced rearwardly therefrom. Because this pushchair has a rigid one-piece seat fixedly mounted on the chassis, it cannot be collapsed into a compact size.

BRIEF SUMMARY OF THE INVENTION

It is therefore among the objects of the present invention to provide an improved collapsible pushchair which overcomes or substantially reduces some or all of the aforementioned disadvantages and is very easy to collapse and erect.

The invention therefore provides a collapsible pushchair which is characterize in that it includes a foldable seat suspended between a collapsible seat hanger and the chassis, the secondary wheels being folded way in their stowed position in the chassis in such a way that the pushchair can still be pushed or pulled on its primary wheels when a baby or infant is in position on the seat.

The chassis may be molded from any suitable rigid plastics material such as mineral filled polypropylene. In the preferred embodiment, the chassis is molded in one-piece.

Suitably, the primary wheels are larger than the secondary wheels. In the preferred embodiment, the secondary wheels are rotatably mounted on a collapsible platform hingedly attached to the chassis. In this embodiment, the platform is formed in two parts which are hingedly connected together to pivot about an axis parallel to the axis of rotation of the primary and secondary wheels.

Suitably a stay or leg extends between each side of the chassis and the rear of the platform remote therefrom, each stay being pivotally connected to both the chassis and the platform. Preferably each stay is configured to allow the secondary wheels to be stored in the chassis in such a way that they do not interfere with a baby when seated on the seat and thus allow the pushchair to be pushed or pulled on its primary wheels only while the secondary wheels are folded away. The stays may include a lower portion attachable to the axis of rotation of the secondary wheels which is off-set with respect to an upper portion which is attachable to the chassis at a location generally coplanar with the primary wheels.

The seat is preferably of the hammock type and made from a fabric material such as vinyl backed cotton or polyester.

The collapsible seat hanger is preferably pivotally attached to the chassis so as to be foldable relative thereto. The folding seat hanger can be U-shaped and is preferably attached to the upper region of the chassis. The seat hanger folds onto the chassis in its stored position. Alternatively, it can be formed as a rigid seat back or a pair of arms pivotally attached to the chassis to which the hammock type seat is attached.

The handle can be retractably mounted directly in the chassis or in the seat hanger pivotally attached thereto.

The chassis can include a footrest and each side member of the chassis in the region of the footrest can be shaped to provide a nose portion which is located forwardly of the axis of rotation of the primary wheels and adapted to contact the ground to allow the pushchair to be freestanding in an upright position when the top of the chassis is positioned in front of the axis of rotation of the primary wheels.

The seat can also include means to allow its angle of inclination to be adjusted.

Preferably the secondary wheels are retained in their stored position in the chassis by means of a releasable latch mechanism. Preferably the means which connect the secondary wheels to the chassis operate so that said wheels automatically unfold from the chassis under the action of gravity when the releasable latch mechanism retaining them in the chassis in their stowed position is released.

The pushchair can also include a safety device with means operable to allow it to automatically unfold into an erected safety position in which is located beneath the seat to protect an infant seated thereon from an impact should the pushchair be dropped by the user.

The chassis is preferably dimensioned so that when the pushchair is fully collapsed, it will be classed as "carry-on" luggage, the handle, seat and secondary wheels all folding or retracting into the chassis so as not to significantly protrude therefrom.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
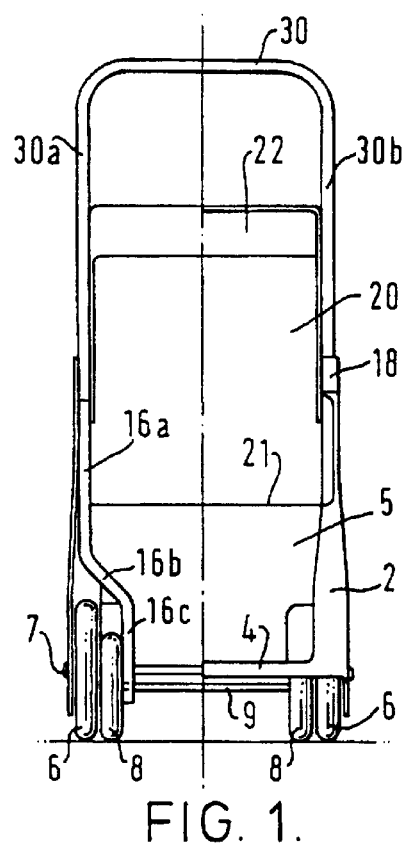
FIG. 1 is a schematic side view of one embodiment of the invention.

Referring to the drawings, there is shown in FIGS. 1–4 a collapsible pushchair which comprises a rigid one-piece molded plastics chassis 1 having sides 2,3 with a footrest 4 extending therebetween. A leg rest 5 extends upwardly from the footrest 4 and terminates in an edge 21 to which the front of a collapsible seat 20 is attached.

Figure 3:
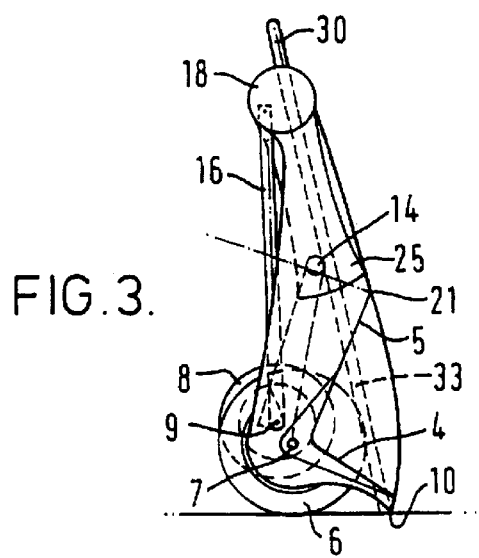
FIG. 3 is a schematic view showing the pushchair of FIGS. 1 and 2 in its folded collapsed position.
Figure 4:
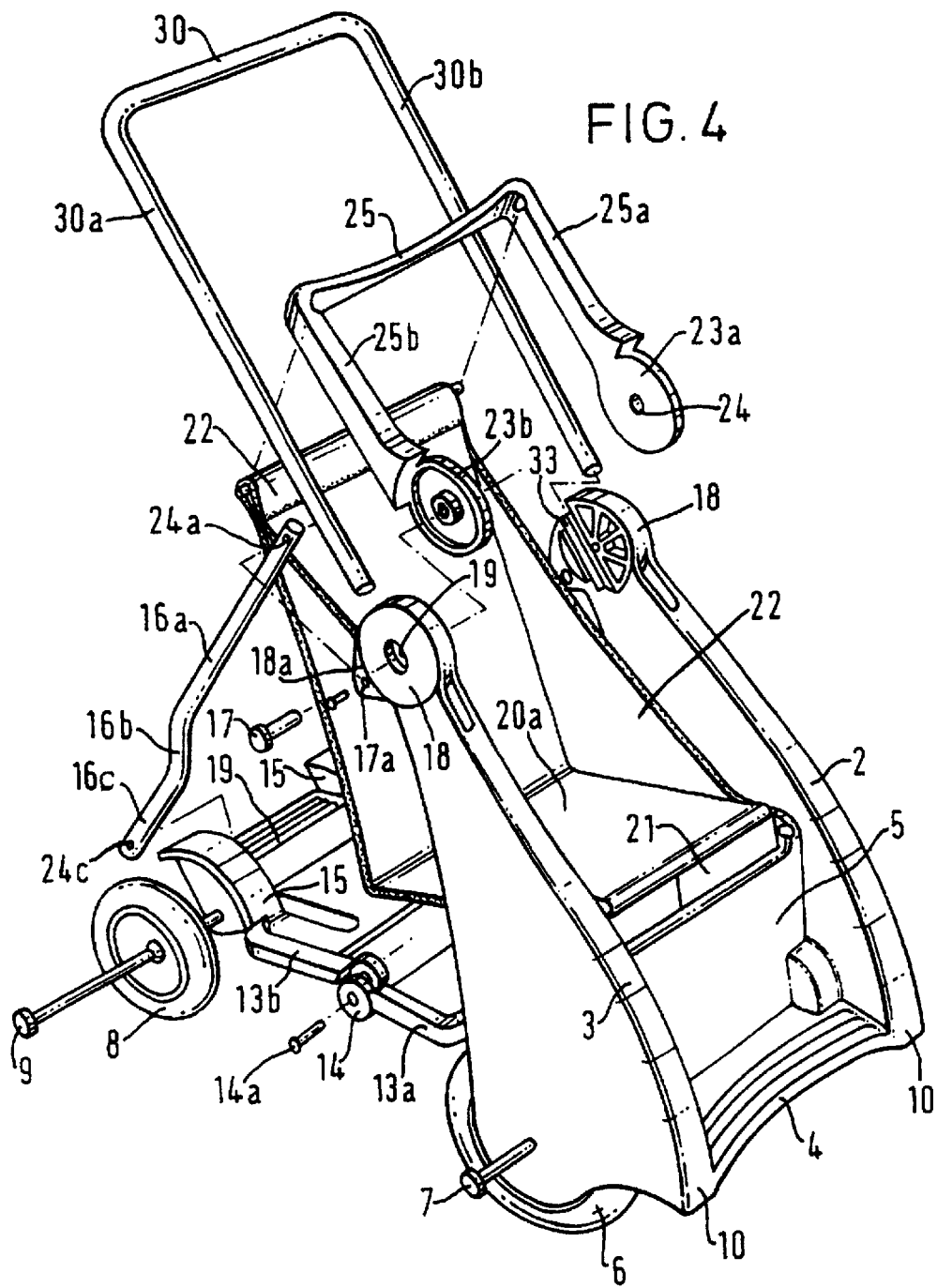
FIG. 4 is an exploded perspective view of the pushchair shown in FIGS. 1–3 when erected.

The seat 20 is of the hammock type and includes an upper tubular portion 22 which is suspended from a U-shaped seat hanger 25 provided with spaced side arms 25a and 25b (see FIG. 4). The free end of each of the arms 25a, 25b is provided with a circular swivel mounting 23a, 23b each having a central hole 24 therein which receives a pivot pin 17 (only one is shown in FIG. 4) to allow the seat hanger 25 to be pivoted downwardly from its raised position shown in FIG. 1 in which the seat 20 is suspended from it to its collapsed configuration shown in FIG. 3 where it is folded forwardly into the chassis to rest between the side rails 2,3 below the upper edges thereof.

The upper region of the each portion 2,3 of the chassis 1 is also formed with a boss 18 shaped to cooperate with the circular swivel mountings 23a and 23b of the seat hanger to provide a pivotal connection therebetween, each boss 18 having a central hole 19 therein which also receives the pivot pin 17.

A U-shaped handle 30 is mounted so as to be capable of being pushed into the chassis 1 or extended therefrom. This is achieved by providing a channel 33 inside each of the side portions 2,3 of the chassis 1, which slidably mounts respectively a side portion 30a or 30b of the handle 30. Abutment means (not shown) are provided at the end of the arms 30a,30b and arranged to prevent the handle 30 being completely pulled out of the chassis when it is in its fully extended position shown in FIG. 1. Similarly, abutment means (not shown) limit the inward movement of the handle (30) to its fully retracted position shown in FIG. 3. In this position, a portion of the handle 30 is left protruding upwardly from the chassis 1 to provide a carrying handle for the pushchair when it is fully collapsed. Suitable locking means (not shown) are also provided to retain the handle 30 in its stowed position shown in FIG. 3.

An axle 7 rotatably mounts the front pair of primary front wheels 6 at the base of the chassis 1 on either side of the leg rest 5. The base of the chassis extends over and around the wheels 6 and includes a nose portion 10 at the end of each side portion 2,3 adjacent each end of the footrest 4. As can be seen more clearly in FIG. 3, these nose portions 10 allow the pushchair to stand freely in an upright position resting on the nose portions 10 when the chassis 1 is tipped forwardly beyond the axle 7.

The pushchair also includes a pair of secondary rear wheels 8 which are rotatable on an axle 9 mounted at the rear of a collapsible platform 13 made up from two sections 13a,13b hingedly attached at 14 by means of a pivot pin 14a on each side of the platform. As a result, the two platform sections 13a,13b are hingedly connected together to pivot about an axis extending parallel to the axles 7 and 9. The front end of platform section 13a (not visible) in FIG. 4 is hingedly attached to the chassis 1 between the front wheels 6 by suitable means (not shown) and the rear edge is molded to include a depressible pedal section 19 to be described in more detail later.

The rear section 13b of the platform 13 is provided with molded mudguards 15 around the secondary rear wheels 8 which are held in their extended operating position by means of a respective stay 16 extending between the axle 9 and the chassis 1. Each stay 16 has an upper portion 16a, a mid-portion 16b and a lower portion 16c. The lower portion 16c has a hole 24c in it through which the axle 9 extends. The upper portion 16a of each stay 16 also has a hole 24a at its end to receive pivot pin 17 which also fits into hole 17a on a lip 18a on the boss 18 at the upper end of each side portion 2,3 of the chassis 1 to pivotally connect the stay 16 thereto.

Figure 2:
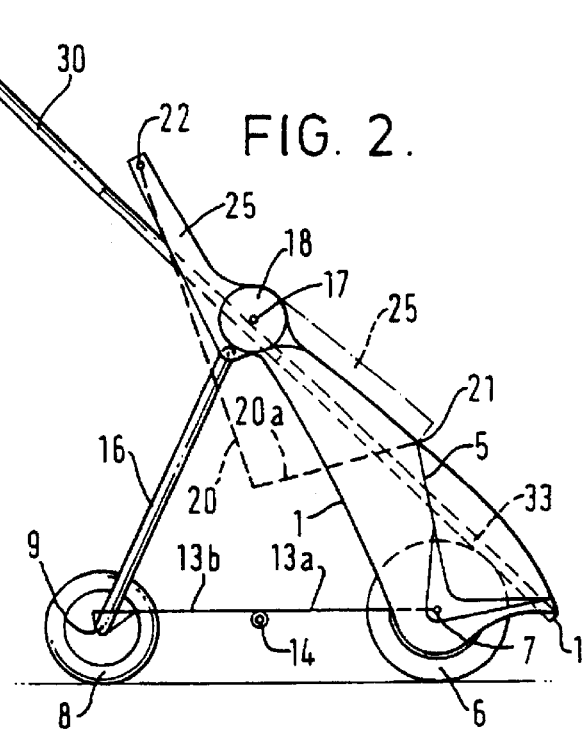
FIG. 2 is a half front and half rear view of the pushchair shown in FIG. 1.

It will be noted from FIG. 2 that the secondary rear wheels 8 are spaced apart by a distance which is less than that between the larger primary front wheels 6 and that the lower portion 16c of each stay 16 is offset with respect to the upper portion 16a. This allows the secondary wheels 8 to be stored in the bottom of the chassis 1 between the primary wheels 6. This is important because it means that the secondary wheels 8 can be stowed below the bottom 20a of the seat 20 leaving the whole of the space behind the seat between the chassis sides 2,3 free of intrusions. As a result, pushchair can still be used as a two-wheeled pushchair which can be either pushed or pulled even with an infant in position on the seat 20.

The chassis also preferably includes a known latch mechanism (not shown) which retains the secondary rear wheels 8 in their stowed position within the chassis 1. To unfold the secondary wheels 8 from the chassis, the user simply has to depress the latch (not shown) using his or her foot which releases the latch and allows the secondary wheels 8 to fold out of the chassis 1 under gravity. To fold the secondary wheels 8 back into the chassis 1, the user simply depresses the pedal 19 on the rear edge of the rear platform section 13b and the two sections 13a,13b pivot upwardly about the pivot axis 14. The stays 16 then rotate about their pivot points 17 and swing into the chassis to their stowed position shown in FIG. 3 where they are retained by means of the latch mechanism (not shown).

Figure 5A:
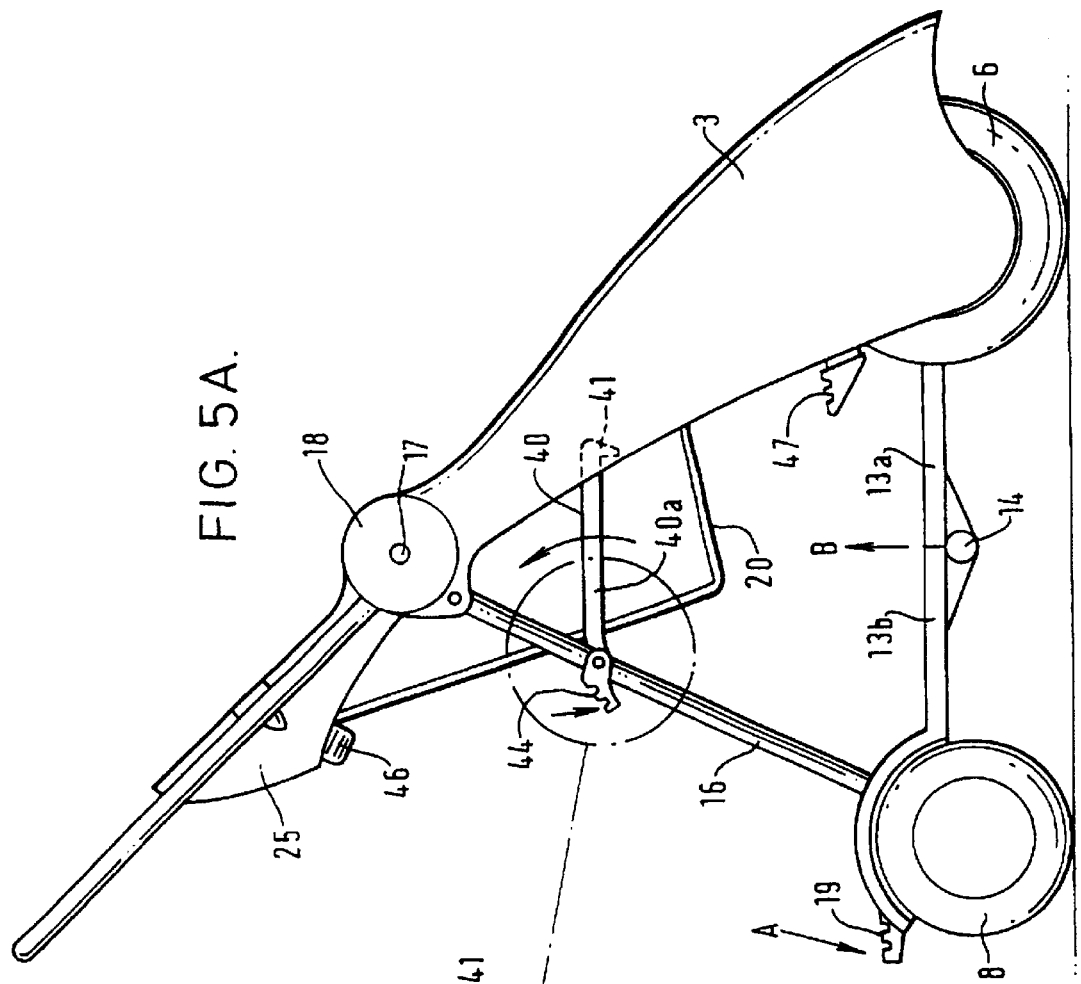
FIG. 5A is a side view of a pushchair similar to that shown in FIG. 4 but including additional optional features.
Figure 5B:
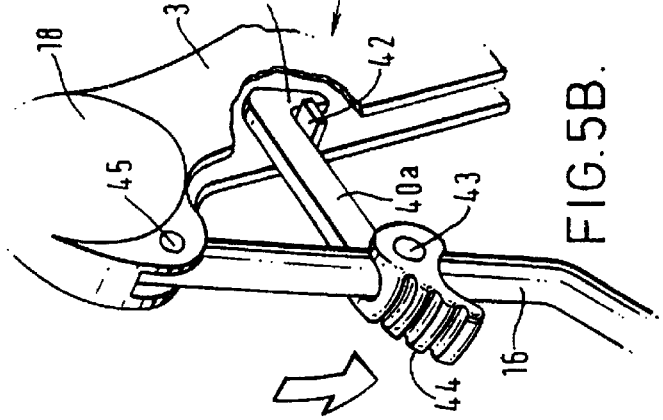
FIG. 5B is a scrap view of the part of the pushchair shown in FIG. 5A.

FIGS. 5A and 5B show various additional features not included in the pushchair illustrated in FIGS. 1–4. In particular, an additional secondary lock 40 may be provided to prevent the pushchair from inadvertently collapsing when a baby is in the seat 20. This secondary lock 40 comprises a locking arm 40a which has a release lever 44 at one end which pivots about pin 43. The arm 40a has a hook 41 at its other end which releasably cooperates with a peg 42 mounted on the chassis side 3.

It will be understood that when the lock 40 is in the position shown in FIG. 5A the stays 16 and the rear wheels 8 cannot move inwardly towards the chassis 1 However, when the release lever 44 (preferably a molded plastics member) is depressed in the direction of the arrow, the arm 40a is raised out of engagement with the peg 42 to allow the pushchair to be collapsed. The lock 40 is configured so that it acts as a gravity latch so when the wheels 8 are unfolded from the chassis 1, the arm 40a automatically drops down into its locked position shown in FIGS. 5A and 5B.

The pushchair shown in FIG. 5A also includes an over-center foot operated brake 47 of known type so it will not be described in further detail. The pushchair can also optionally include a release button 46 which allows the rake of the seat back 25 to be adjusted in known manner.

Figure 6:
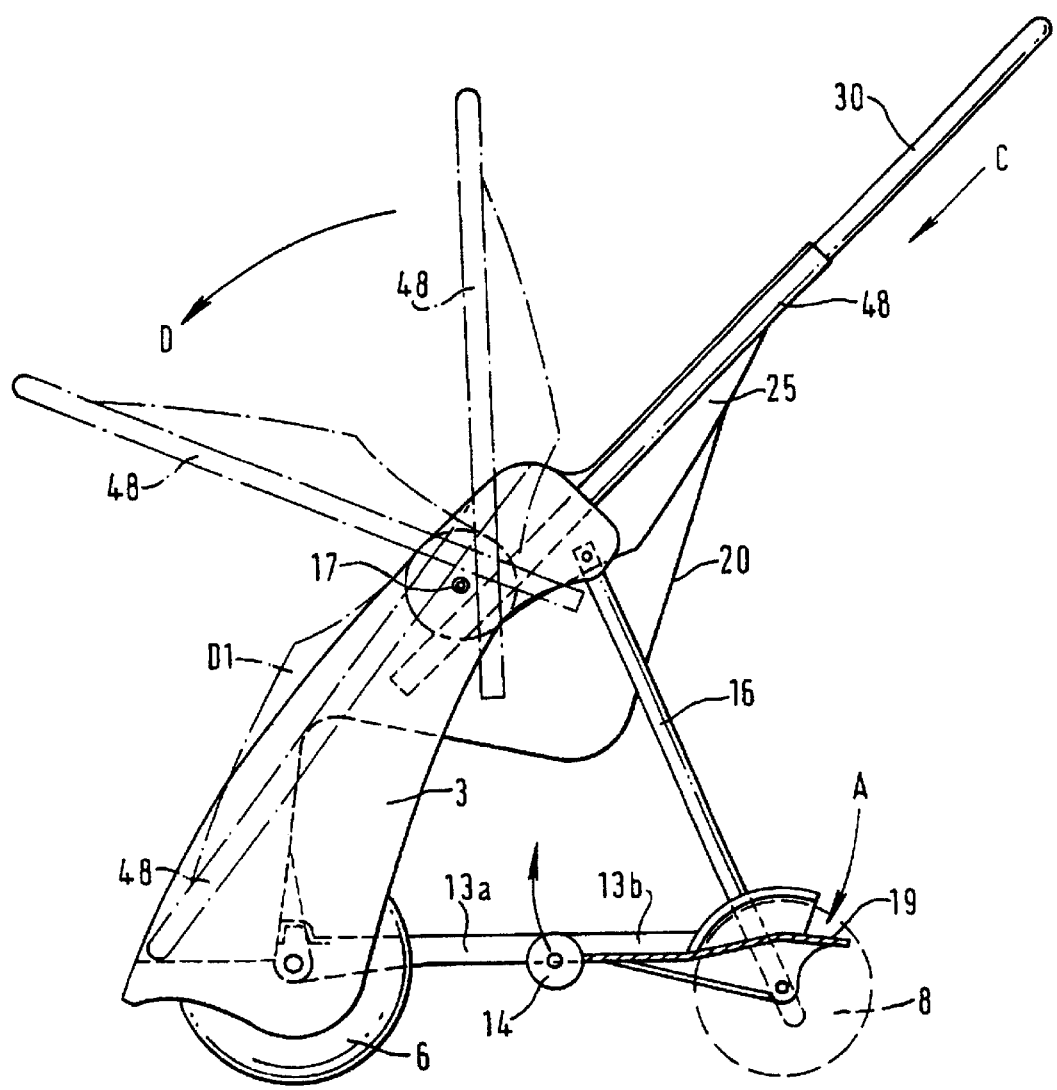
FIG. 6 is a schematic view of another embodiment of pushchair.

Turning now to FIG. 6, the illustrated pushchair is very similar to that described and illustrated in FIGS. 1–5 so the same reference numerals are used for the same or similar parts. The main difference is that the seat back 25 is a structural component and the handle 30 telescopes into and out of it rather than the chassis. Also the pivot point 17 for the seat back 25 is different in that it is spaced from rather than at the end of each chassis side members 2,3. This means that the handle 30 can be telescoped completely into the seat back 25 which can then be folded over so that it is wholly contained within the dimensions of the chassis side members 2,3. As a result, the collapsed pushchair is of even more compact dimensions as the top of the handle 30 no longer protrudes beyond the chassis 1 as shown in FIG. 3.

Preferably, a tube 48 is mounted in each side member of the seat back 25 to receive the handle 30 to ensure that it can cope with the extra load which is generated as a result of moving the pivot point 17 away from the top of the chassis members 2,3.

As with the pushchair of FIGS. 1–5, depressing the pedal 19 in the direction of arrow A causes the pivot 14 for the carrying platform 13 to move upwardly in the direction of the arrow B thereby allowing the rear wheels 8 to move forwardly into their stowed position between the front wheels 6 where they are retained by a catch (not shown). The handle 30 can then be fully telescoped into the side members of the seat back 25 in the direction of arrow C and it can then be folded forwardly in the direction of arrow D into its fully stowed position D1, whereby it is wholly contained within the external dimensions of the chassis 1. To unfold the pushchair, the user simply releases the foot catch on the chassis and the rear wheels then automatically drop out of the chassis under gravity and unfold into their position shown in FIG. 6. The seat back 25 can then be folded up and the handle 30 extended.

The pushchair of FIG. 6 preferably also includes the secondary lock 40 and/or the rake adjuster 46 and/or the foot brake 47 of the FIG. 5A embodiment.

Referring now to the pushchair shown in FIGS. 7 and 8, this is very similar to those described with reference to FIGS. 1–6 except that the seat 20 is suspended from a pair of rigid side arms 50 which are pivotally attached to the chassis 1 and telescopically receive and house the handle 30. The arms 50 also include a telescopic lock 51, a pivot lock 52. A safety device 53 is mounted on the chassis 1 and will be described in more detail hereafter.

The side arms 50 are each molded from a rigid plastics material and are pivotally attached at 55 to the top of the chassis 1. A metal tube (not shown) is housed in each arm 50 to telescopically receive the handle 30 and take the load thereof in much the same manner as that shown and described with reference to the FIG. 6 embodiment. The pivot lock 52 is of known type and automatically locks the arms 50 in their erected position shown in FIG. 7B. Release of the lock 52 by depressing the button protruding from each arm 50 allows the arms to be folded down onto the chassis 1.

Figure 7A:
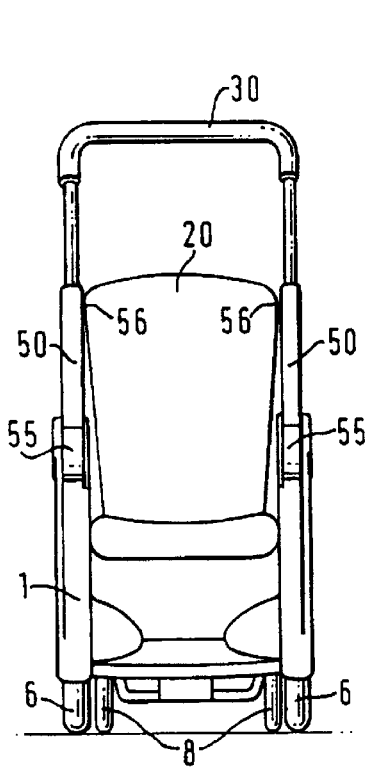
FIGS. 7A–7D are views of a still further embodiment which includes a locking safety device.

Each top corner of the hammock type seat 20 is attached at location 56 to a side arm 50 and thus is suspended therefrom as can be better seen in FIG. 7A.

Figure 7B:
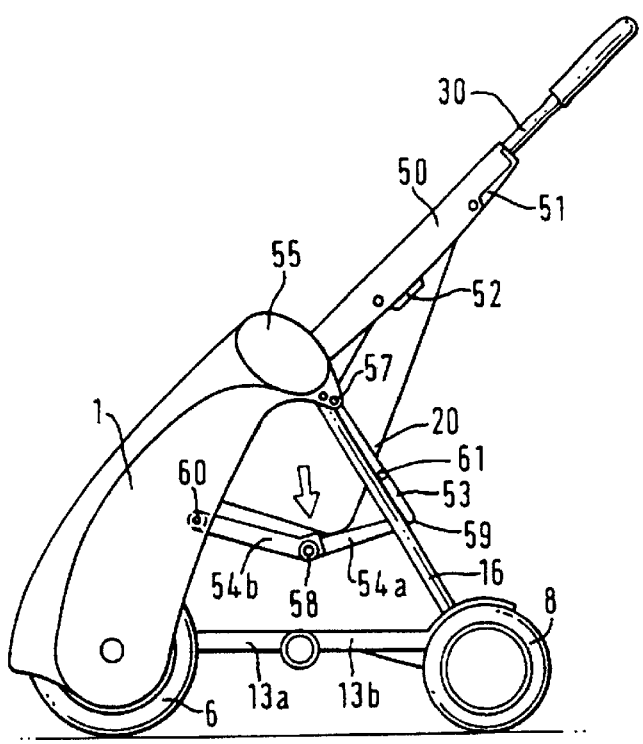
Figure 7C:
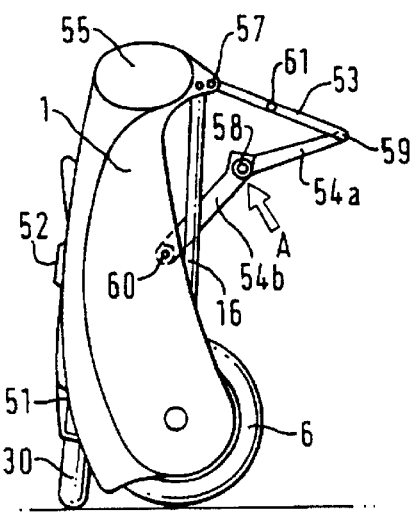
Figure 7D:
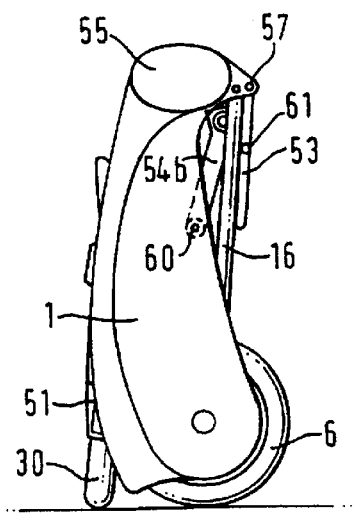
Figures 8A, 8B:
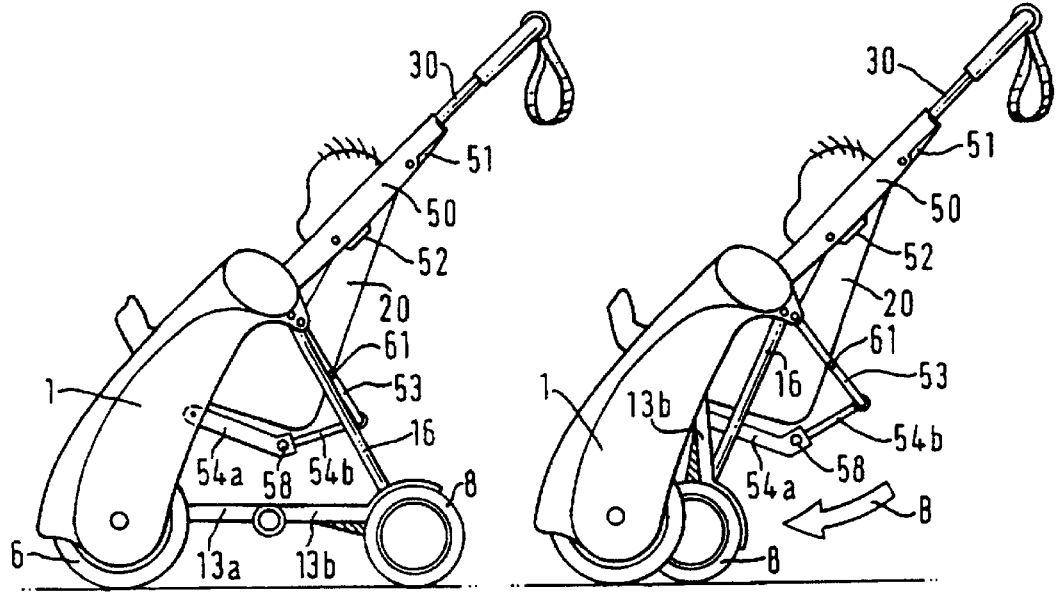
FIGS. 8A–8C show the operation of the safety locking device shown in FIG. 7.

The safety device on the pushchair illustrated in FIGS. 7A–7D comprises support means in the form of a U-shaped support member 53 which automatically drops into place when the pushchair is unfolded, the support member 53 being retained in its unfolded safety position shown in FIGS. 8A or 8B by the over-center locking assembly 54 attached thereto until it is manually released in a manner to be described shortly.

The U-shaped support member 53 is preferably made of metal or a rigid plastics material, the free ends of which are pivotally attached at 57 to opposite upper ends of the chassis 1. A pin 61 protrudes from each side of the U-shaped member 53 to engage with its adjacent support stay 61. The over-center locking assembly 54 comprises a pair of arms 54a and 54b pivotally connected to each other at 58. One end of arm 54a is pivotally attached at 59 to the U-shaped support member 53 whereas one end of the arm 54b is pivotally attached at 60 to the chassis 1. The separate arms 54a,54b can however be replaced by a U-shaped arm whose free ends are pivotally attached to a triangular shaped member whose apex is pivotally attached to the chassis 1.

The arms 54a and 54b are configured and connected to each other and between the chassis 1 and support member 53 to operate as an over-center locking device in known manner hereby the support member 53 automatically unfolds and then remains in its locked position shown in FIG. 7B or FIGS. 8A–8C until released. As this over-center locking assembly is of known type so its detailed operation and construction will not be described further.

Figure 8C:
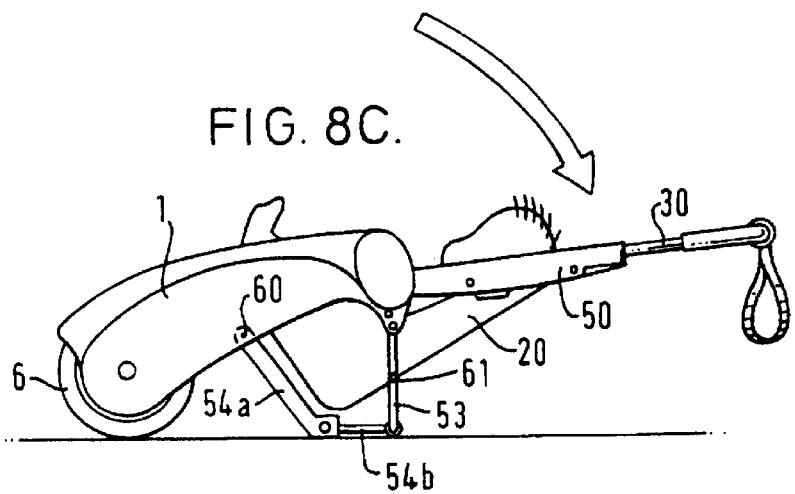

The purpose of the safety support member 53 is to provide some means which will protect a baby seated in the pushchair from taking the full impact should the pushchair be dropped accidentally by the user when the pushchair is being used in its two-wheeled mode shown in FIG. 8C with the secondary wheels 8 folded away into the chassis 1.

The folding and unfolding sequence will now be described. FIG. 7D shows the pushchair in its fully collapsed condition and FIG. 5A shows it in its fully erected condition with the support member 53 in its protective position located beneath the infant in the seat 20 and locked in position by means of the over-center locking assembly 54. It is to be understood that when the user releases the catch (not shown) the secondary wheels 8 drop out of the chassis 1 and assume their extended position shown in FIG. 7B or 8A. As the wheels 8 move away from the chassis 1, the stays 16 engage with the pegs 61 on the support member 53 and move it outwardly into its position shown in FIG. 7B or BA. At the same time, the folded-up over-center locking assembly 54 will automatically unfold under gravity aided by the outward movement of the support member 53 connected thereto caused by the engagement of the pins 61 thereon with the stays 16. The over-center locking assembly only assumes its final locked position shown in FIGS. 7B, 8B or 8C when a baby is placed in the seat due to the contact between the baby and the locking assembly 54 thereby providing an added safety feature. Once in its extended position shown in FIG. 7B, the safety support member 53 cannot be folded back into the chassis 1 until it is manually released in the manner to be described shortly.

FIG. 8B shows the pushchair being collapsed into its two-wheeled mode in which the secondary wheels 6 are being folded back into the chassis 1 while leaving the support member 53 in position behind the seat 20.

FIG. 8C shows what happens if the pushchair is dropped accidentally by the user and it will be seen that the infant in the seat 20 is protected from the impact by the extended U-shaped support member 53.

To return the pushchair from its erected condition shown in FIG. 7B to its fully folded condition shown in FIG. 7D, the catch 51 on each arm 50 is first released to allow the handle 30 to be telescoped into the arms 50 and the catch 52 on each arm 50 is then released to allow the arms 50 to be folded over on to the chassis 1. The foot pedal (not shown) is then released to allow the secondary wheels 8 to be folded into the chassis 1 leaving the support member 54 still in its extended condition shown in FIG. 8B. The over-center locking assembly 54 can then be moved by the user towards the chassis 1 in the direction of the arrow A as shown in FIG. 7C as a result of which the support member 53 is pivoted and drawn towards the chassis 1 until it eventually comes to rest in its fully collapsed condition shown in FIG. 7D.

The major advantage of the pushchairs shown in the drawings is their ease of use in that they can be readily folded into or unfolded from their collapsed state by simply releasing the pedal operated latch mechanism (not shown) mounted on the chassis 1 between the secondary rear wheels 8 to release them and allow them to unfold outwardly from the chassis 1 under the action of gravity until the carrying platform 13 has assumed its horizontal orientation shown in the drawings. The seat hanger 25 can then be folded out of the chassis 1 into its raised position shown in the drawings in which the seat 20 is suspended from it and ready to accept an infant. The final step is to withdraw the carrying handle 30 from the chassis 1 from its stored position to its erected position. The user can then place his or her shopping or other articles on the carrying platform 13 where it can be stored. Furthermore, the additional weight thereof will add to the stability of the whole pushchair as it is concentrated between the primary and secondary wheels 6 and 8.

The pushchairs may also include a specially shaped carrier bag (not shown) suitable for fitting on the platform 13 which will have a pair of handles on it so that the mother can readily remove it from the pushchair, fold up the secondary wheels 8 and convert the pushchair into a two-wheel push-pull version. This can be useful, for instance, if the mother needs to board or get off a bus or train having steps as the two-wheeled pushchair can be readily pulled up or lowered down the steps due to the large sized primary wheels 6. This can be particularly advantageous where access space is limited and the user cannot maneuver a four-wheeled pushchair in it.

Should space be at a premium, e g. if the pushchair is to be stored in an overhead locker in an airplanes, then the pushchair of the invention is readily collapsible into its chassis 1 which is dimensioned so as to be classed as "carry-on" luggage and placed in the overhead lockers.

A major advantage of the pushchairs of the invention is that they have been specifically designed so that the secondary wheels can readily be collapsed into their stored condition in the chassis and unfolded into their erected position using the pedal and foot operated catch which holds them in their stored position in the chassis. Thus, it is very easy for a mother to convert the four wheeled pushchair into a two wheeled pushchair if she is confronted by an obstacle such as a set of stairs for instance because all she has to do is to depress the foot operated pedal at the rear of the pushchair which causes the load carrying platform to pivot upwardly about its central pivot axis thereby allowing the secondary wheels to be pushed forwardly into the chassis in one movement to be retained therein by the foot operated catch. She can then negotiate the stairs very easily with the pushchair in its two wheeled configuration and all she needs to do when she has negotiated the obstacle to return it to its four wheeled configuration is to release the catch holding the secondary wheels in the chassis and they will fall out under gravity into their erected position.

If the pushchair is to be fully collapsed to become a "carry on" item of luggage, the handle 30 is either pushed into the chassis 1 or it is pushed into the seat hanger or seat back 25 or side arms 50 which is then folded over onto the chassis and the secondary wheels are folded into their stored position in the chassis on depression of the foot pedal 19.

It will be appreciated from the foregoing that the pushchairs of the present invention are extremely easy to use and can be erected or collapsed by the user with one hand only leaving the other hand free to hold the child.

What is claimed is:

1. A collapsible pushchair comprising a chassis having mounted thereon:
   a pair of primary wheels;
   a handle for pushing or pulling the pushchair along;
   a collapsible seat hanger pivotally attached to the chassis so as to be foldable relative thereto;
   a foldable seat suspended between the collapsible seat hanger and the chassis, said seat having an upper end and a lower front end, the upper end being suspended from the seat hanger and the lower front end thereof being attached to the chassis;
   a pair of secondary wheels attached to the chassis by means operable to allow them to be folded into a stowed position in the chassis adjacent the primary wheels such that the pushchair can be pushed or pulled on its primary wheels when a baby or infant is in position on the seat, and unfolded into an operating position in which the secondary wheels are spaced rearwardly from the chassis;
   wherein the handle is retractably mounted in the seat hanger.

2. A pushchair as claimed in claim 1 wherein the chassis is molded from a rigid plastics material.

3. A pushchair as claimed in claim 1 wherein the chassis is molded in one piece.

4. A pushchair as claimed in claim 1 wherein the primary wheels are larger than the secondary wheels.

5. A pushchair as claimed in claim 1 wherein the secondary wheels are rotatably mounted on a collapsible platform hingedly attached to the chassis.

6. A pushchair as claimed in claim 5 wherein the platform is formed in two parts which are hingedly connected together to pivot about an axis parallel to the axis of rotation of the primary and secondary wheels.

7. A pushchair as claimed in claim 5 wherein a leg extends between each side of the chassis and the rear of the platform remote from said chasis, each leg being pivotally connected to both the chassis and the platform.

8. A pushchair as claimed in claim 7 wherein each leg is configured to allow the secondary wheels to be stored in the chassis in such a way that they do not interfere with a baby when seated on the seat and thus allow the pushchair to be pushed or pulled on its primary wheels only while the secondary wheels are folded away.

9. A pushchair as claimed in claim 7 wherein each leg includes an upper portion and a lower portion, the lower portion being attached to the axis of rotation of the secondary wheels and off-set with respect to the upper portion which is attached to the chassis at a location generally coplanar with the primary wheels.

10. A pushchair as claimed in claim 1 wherein the seat is a hammock.

11. A pushchair as claimed in claim 1 wherein the collapsible seat hanger is U-shaped and pivotally attached to the upper region of the chassis.

12. A pushchair as claimed in claim 1 wherein the seat hanger folds onto the chassis in a stored position.

13. A pushchair as claimed in claim 1 wherein the chassis includes a footrest.

14. A pushchair as claimed in claim 13 wherein the chassis has side members shaped in the region of the footrest to provide a nose portion which is located forwardly of the axis of rotation of the primary wheels and adapted to contact the ground to allow the pushchair to be freestanding in an upright position when the top of the chassis is positioned in front of the axis of rotation of the primary wheels.

15. A pushchair as claimed in claim 1 wherein the seat includes means to allow the angle of inclination thereof to be adjusted.

16. A pushchair as claimed in claim 1 wherein a safety device including a support member with locking means associated therewith to allow the support member to automatically unfold into an erected position located beneath the seat and retain the support member in its erected position until manually released.

17. A pushchair as claimed in claim 16 wherein the support member is U-shaped and the locking means is an over-center locking assembly connecting the support member to the chassis.

18. A pushchair as claimed in claim 1 wherein the secondary wheels are retained in their operating position by a releasable latch mechanism.

19. A pushchair as claimed in claim 18 wherein the secondary wheels are connected to the chassis by means operable, in use, so that the wheels can be folded into the chassis when the releasable latch mechanism retaining them in their operating position is released.

20. A collapsible pushchair comprising a chassis having mounted thereon:

a pair of primary wheels;

a handle for pushing or pulling the pushchair along;

a collapsible seat hanger pivotally attached to the chassis so as to be foldable relative thereto and having a pair of side arms pivotally attached to the chassis;

a foldable seat suspended between the collapsible seat hanger and the chassis, said seat having an upper end and a lower front end, the upper end being suspended from the seat hanger and the lower front end thereof being attached to the chassis;

a pair of secondary wheels attached to the chassis by means operable to allow them to be folded into a stowed position in the chassis adjacent the primary wheels such that the pushchair can be pushed or pulled on its primary wheels when a baby or infant is in position on the seat, and unfolded into an operating position in which the secondary wheels are spaced rearwardly from the chassis; and wherein the handle is retractably mounted in the pair of side arms.

21. A pushchair as claimed in claim 20 wherein the secondary wheels are retained in their operating position by a releasable latch mechanism.

22. A pushchair as claimed in claim 21 wherein the secondary wheels are connected to the chassis by means operable, in use, so that the wheels can be folded into the chassis when the releasable latch mechanism retaining them in their operating position is released.

* * * * *